United States Patent
Hofmann et al.

[15] 3,635,738
[45] Jan. 18, 1972

[54] PACKAGED MEAT PRODUCT AND PROCEDURE FOR MAKING IT

[72] Inventors: Robert G. Hofmann, 9362 Springfield Drive, Allison Park, Pa. 15101; Richard E. Hofmann, 504 Wimer Circle, Pittsburgh, Pa. 15237

[22] Filed: Sept. 2, 1969

[21] Appl. No.: 854,566

[52] U.S. Cl. ................................................99/169, 99/176
[51] Int. Cl. ..................................................A22c 13/00
[58] Field of Search..................99/175, 176, 169, 144, 107, 99/157

[56] References Cited

UNITED STATES PATENTS

| | | | |
|---|---|---|---|
| 2,686,726 | 8/1954 | Grantham | 99/175 UX |
| 3,104,682 | 9/1963 | Schenk et al. | 99/176 X |
| 2,307,181 | 1/1943 | Young | 99/175 UX |
| 3,115,240 | 12/1963 | Flomen et al. | 99/175 X |
| 2,866,710 | 12/1958 | Dowd et al. | 99/176 |
| 2,428,495 | 10/1947 | Lesparree et al. | 99/169 UX |
| 2,440,517 | 4/1948 | Lesparre | 99/157 |
| 2,721,142 | 10/1955 | Shinn et al. | 99/107 X |
| 2,788,279 | 4/1957 | Luer, Jr. | 99/175 X |
| 1,976,448 | 10/1934 | Lawler | 99/107 X |
| 3,369,911 | 2/1968 | VonWitzleben | 99/176 |

*Primary Examiner*—Frank W. Lutter
*Assistant Examiner*—Steven L. Weinstein
*Attorney*—Green, McCallister & Miller

[57] ABSTRACT

Process meat and the like is provided with an outer edible, ply, layer or enclosure of a desired color that protects the meat, retains moisture therein, and provides a pleasing display package for the food product. Procedure is used in which a relatively thin, paperlike open end casing, membrane or bag is filled or stuffed with a ground meat type of food mixture, the open end of the bag is securely closed off, the mixture is cooked in the casing and cooled, the casing is then dipped within or covered with a somewhat viscous emulsion or mix which adheres thereto, and the article or food product is cooled to solidify the emulsion as a snowy white outer ply, layer or enclosure for the food product.

8 Claims, 5 Drawing Figures

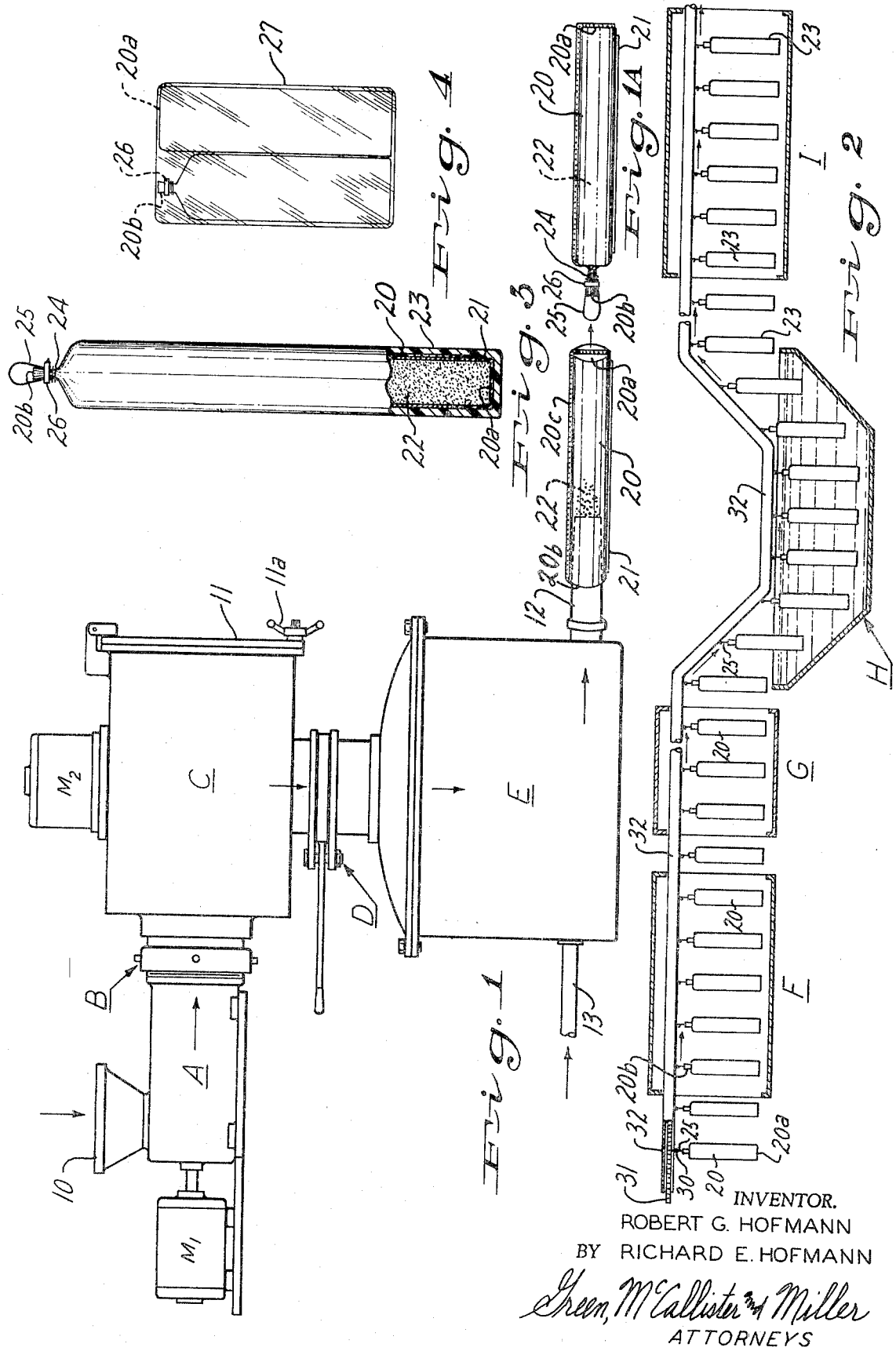

PACKAGED MEAT PRODUCT AND PROCEDURE FOR MAKING IT

It has been an object of the invention to devise new and improved procedure for packaging food in the nature of meat and particularly meat mixes, and to provide a new and improved form of package or enclosure therefor.

A phase of the invention deals with an outer dip coating of a desired color which adheres to an inner casing or to the food, itself, which protects the food content, and which facilitates marketing the food product.

Previous to the present invention, it has been customary to employ hog bung as a casing for meatlike food mixes such as liverwurst, head cheese, liver cheese, etc. However, it is impossible to control the size of the bung and even the best grade which costs in the neighborhood of $1.00 to $1.50 each has a brownish color and has to be bleached to give it a whitish appearance. The bleaching becomes lost after a few days and the bung then turns to a dark brownish color which is unappetizing to a prospective purchaser of the meat product. So-called bung seconds cost $.60 each but tend to have scars which cannot be bleached white and are of less uniform size and shape. Another disadvantage of a bung is that it tends to dry out and produce a ringlike layer along the outer periphery of the meat or meat mixture due to loss of moisture.

There has also been a need on occasion for a covering to protect solid meat products such as fowls, roasts, etc., and to provide a special coloring to the enclosure for occasions, such as Christmas, Thanksgiving, New Years, etc.

In endeavoring to meet the problem, various artificial types of casings were devised, but it was found that an ordinary resin or plastic type of casing was impractical for a number of reasons including its toughness or resistance to slicing or cutting when the food product is to be used. It was discovered that an unfinished rag-filled type of paper of relatively thin thickness but of some tensile strength would provide the necessary characteristics desired, except a pleasing display appearance and retention of moisture within the meat mixture. A suitable primary inner liner, casing, bag, sock or enclosure can be formed from either a flat sheet of material suitably cut and with its edges secured together in a lap seam to both enclose the bottom and the side of the casing, or can be formed as a unitary structure, depending on the equipment available. The casing may be made up of a single or double layer thickness of the paper.

It was further determined that a suitable edible outer ply, layer, coating or enclosure can be advantageously employed to completely close off the primary, inner, supporting casing that will adhere to the surface of the casing, will retain moisture in the meat or meat mixture, will give additional and improved protection to the meat product, and will also insure a pleasing foodlike appearance for display of the product that will be retained throughout the display period and the edible use period of the food product.

It has thus been an object of the invention to solve the problem heretofore encountered in the use of bung, and to provide an inexpensive and practical casing for food materials that will solve the problem.

Another object has been to provide an edible outer enclosing ply, coating or enclosure for a meatlike product which serves to protect the food content as well as to provide and maintain a pleasing appearance and an acceptable exposed surface for display and marketing purposes and also when a portion of the packaged food product has been removed or cut off by the housewife for consumption.

Another object has been to provide an inner casing for food mixes and the like that will take the place of the conventional hog intestine or bung, that will assure a uniformity that is not possible with bung, that can be easily cut or sliced in using the food product, and that will stand up under cooking and other processing to which the mix is subjected.

A further object of the invention has been to provide a composite casing having an inner preformed supporting part into which a meat mix may be stuffed, having an outer protective enclosing part that may be provided with a desired coloring and color stability and that is applied as an emulsion and solidified on the inner part.

A still further object has been to provide a protective emulsion for food products that is edible and protects the meat, and that has a desirable or appetizing color and also stability.

These and other objects of the invention will appear to those skilled in the art from the illustrated embodiment and the description thereof.

In the drawings,

FIG. 1 is a side view in elevation showing suitable apparatus for producing a meat mix and for stuffing it within or filling an inner sock, bag or casing of the invention.

FIG. 1A is a side view in elevation illustrating a step in the procedure that follows the filling or stuffing operation of FIG. 1, and which involves the closing off of an open mouth or end portion of the inner casing and then providing it with a stringlike loop or eyelet for suspending it during subsequent processing steps.

FIG. 2 is a somewhat schematic view in elevation illustrating a continuous processing line for conditioning the meat that has been stuffed, as shown in FIG. 1, for applying an outer emulsion type of coating to the inner casing, for dripping the emulsion to provide a substantially uniform coating, and for setting the emulsion to adhere to surface portions of the inner casing and present the food product with a relatively smooth outer surface.

FIG. 3 is an enlarged view in elevation and partial section illustrating a complete food product after it has been processed in a line such as illustrated in FIG. 2 and is in a condition suitable for final packaging.

FIG. 4 illustrates one form of packaging that may be employed where the food product of FIG. 3 is cut in half and enclosed in a clear plastic wrap of a suitable resin material.

Referring to FIG. 1 of the drawings, meat and other ingredients of the food product that are to be ground and mixed may be introduced into a suitable grinding apparatus A through chute or funnel 10. An electric motor $M_1$ is shown operatively connected to actuate the grinder. Groundup food material is then flowed from the one end of the apparatus A through a sleevelike coupling B into one end of a mixing device or apparatus C. The apparatus C has a conventional rotatable mixing disk or wheel (not shown) that is actuated by a second electric motor $M_2$. The apparatus C has a swing door 11 that may be used for cleaning-out purposes and for introducing any additional ingredients that are to be mixed. The door 11 is maintained in a securely closed relation during the mixing operation by a threaded bolt and clamping thumbscrew assembly 11a. After the mixing has been completed, the material may be then fed through a connection into a pressure tank E by opening a sluice valve D. Suitable stuffing pressure may be applied to the viscous food mixture in the apparatus E by the application of positive fluid pressure through inlet pipe 13 to force it out through a projecting nozzle 12. As shown, a socklike or cylindrical-shaped inner liner 20 is provided and has its open front end portion 20b provided with a tight slide fit on the end of the nozzle 12. Incidentally, the apparatus A, C, D and E illustrates that any suitable conventional apparatus for the stated purposes may be utilized.

The casing or inner enclosure 20 is hollow to receive the food material that is forced or pressed out through the nozzle 12 until it is completely stuffed up to a short distance from its open end portion 20b. Incidentally, the open end portion 20b may be manually held in position on the nozzle 12 or clamped thereon during the filling or stuffing operation. In FIG. 1, the casing 20 is shown made from a flat length of fibrous paperlike material by joining its edges in a seam 20c to define a closed bottom or back end portion 20a and a closed sidewall portion. In this figure, a thin strip or length of white paper or cardboard 21 is shown placed, pasted or secured along the underside of the wall of the casing 20 to serve as a supporting reinforcement and prevent wrinkling of the casing 20 during the stuffing or filling operation. This strip 21 may consist of a single, narrow width of transversely curved piece of material or a group of adjacent pieces, printed with advertising material.

After the viscous food mixture 22 has substantially completely filled the casing 20, then the end portion 20b may be bunched and bound tied together, as by twisting or wrapping two or three turns of a wire loop 24 thereabout to securely close and seal it off, as indicated in FIG. 1A. Before this is done, however, it is advisable to insert end portions of a string or cord loop or eyelet 25 in the bunched end portions of the material; if desirable, the wire 24 may be wrapped with a plastic tape 26 to hold it securely in place along with ends of the string eyelet 25.

After the preliminary food package shown in FIG. 1A has been formed, then it may be further processed manually or in a continuous manner as illustrated in FIG. 2. In this connection, each casing 20 is shown hung in a vertical upright position by means of a hook or clamp 30 on a suitable supporting means which, as shown, may be a continuous cable or chain 31. The chain 31 is, as illustrated, adapted to be moved continuously by any suitable means such as a motor driven sprocket or pulley wheel along a hollow guide tubing or strip 32. As shown, the strip 32 has an open longitudinal slot along its bottom portion which bypasses the hooks 30, but is of insufficient width to permit the chain or cable 31 to drop therefrom. The thus supported filled casings 20 are then advanced progressively, as shown, first through a cooking oven, chamber or area F for cooking the meat product, then through a cooling chamber or area G before being moved into and through an emulsion dip, applicator bath or zone H.

The emulsion of the bath H is applied over the full extent of the casing 20, leaving a small uncovered portion at the extreme front or upper end of the portion 20b. From the bath H, the casing is then moved through an open area during which any excess emulsion drips off and into a cooling or seating chamber I at which the dripping-off action is completed and the emulsion forms a substantially uniform thickness coating or enclosure 23 about the casing 20 (see FIG. 3) to form the food package product shown in FIG. 3. As also illustrated in this figure, the emulsion outer ply or coating 23 has a relatively heavier thickness than the inner ply or casing 20 and when properly compounded and used with a casing 20 of a membraneouslike nature, provides a good adherency therewith along its own inner surface, and has an outer surface which is somewhat smooth and nonsticky.

Thereafter, if desired, the packaged food product of FIG. 3 may be sliced in half and placed in a display package of clear resin material to provide a smaller, rectangular-shaped package which at its opposite ends will show a section through the meat product 22, including its inner and outer plys 20 and 23, so as to add to the attractiveness and sales appeal. Also in accordance with the invention, an edible type of emulsion has been devised which has a snowy white, very pleasing color and which retains its whiteness during the normal edible period of the meat product whether it is liverwurst, head cheese or liver cheese, etc. In other words, it does not turn into an unappetizing yellowish or brownish color and serves to seal off the meat product in such a manner as to retain moisture therein and avoid forming a darkened outer periphery about the food material 22 within the casing assembly. The outer ply, layer or enclosure 23 serves to increase the shelf life of the product and to give it an appealing and appetizing appearance.

The reinforcing strip 21 is preferably of relatively smooth white paper or board which may have a thickness about twice the thickness of a sheet or ordinary 20-pound bond paper. The composition of the outer layer 23 is important in providing an edible protective enclosure as a thickness, ply or part that is adherent to the inner lining thickness, ply or part 20, and that presents a snow-white appearance and a smooth outer surface. The important ingredients used in the composition are water, lard, gelatine, salt and milk powder. A typical bath batch may employ about 50 to 150 pounds of water (optimum about 100 pounds), 20 to 30 pounds of gelatine (optimum about 25 pounds), about 5 to 15 pounds of lard (optimum about 10 pounds), about 15 to 25 pounds of milk powder (optimum about 20 pounds) and about 2 to 10 pounds of salt (optimum about 5 pounds). These ingredients are thoroughly mixed and preferably at a raised temperature up to about 250° F. as a maximum down to about room temperature, with an intermediate temperature facilitating the thorough mixing of the ingredients, For example, if placed in a food chopper, a suitable temperature may be attained by operating the chopper at a speed which when a thermometer is inserted in the emulsion indicates a temperature of about 100° to 125° F.

The lard is important from the standpoint of obtaining a good texture, with the higher content within the range giving a smoother outer surface. Above the maximum specified, the finish is too greasy. The amount of gelatine determines the firmness of the coating. For a correct adherency and a soft but firm coating without hardness, the specified range is important. Salt is used both for preservation and for preventing rancidity of the lard; it further provides some body to the coating. Milk powder has the dual purpose of providing the snow-white color in combination with the lard for the edible life of the meat product, and aids in giving the coating or ply a good texture and proper body. The temperature of the dip or emulsion, as applied, is important from the standpoint of obtaining a desired thickness of the coating. For example, 108° F. produces about one-eighth inch thickness of outer coating 23 and a slightly lesser temperature of about 95° will provide a thickness of about one-fourth of an inch. The range of one-fourth to one-eighth of an inch has been found highly satisfactory. The fixing or setting of the emulsion coating can be accomplished at a temperature in the neighborhood of about 40° F. in the cooling chamber or area I. In this connection, however, the maximum temperature for setting is in the neighborhood of about 50° F.

The meat, for example a typical braunschweiger mix, consisting of groundup pork livers, sweet pickle trimmings, beef trimmings, fat boneless beef, spices and water, may be cooked within the chamber or stove F at a temperature of about 148° to 152° F. The meat content sets at about 30° to 55°. The emulsion, in addition to its use with an inner liner 20, whether of a conventional bung type or of the preferred paper type, also has been found effective as a glaze for hams, turkeys, etc., and can be provided with food coloring and flavoring, if desired. Since it is edible, it also may serve for basting. The viscosity of the aqueous emulsion as mixed may be in the neighborhood of about 50 to 75 Saybolt Universal at 100° F., with an optimum in the neighborhood of about 60 S.U.S. It can be applied and will adhere to any suitable membraneouslike inner liner whether of animal or manufactured origin. The inner lining 20, however, is preferably of somewhat porous paperlike material such as used for filter cloths, wiping cloths, shirt liners, etc., which has a suitable strength but is easily sliced by a somewhat dull knife along with the outer emulsion coating 23. A weight within a range of about 1.25 to 1.95 ounces per yard has been found to be satisfactory for the fiberlike material of the casing 20.

Although the food material, such as the ground meat mixture, is often called an emulsion by the trade, we have avoided such terminology to obviate confusion from the standpoint of the emulsion that is applied as a liquid and that solidifies for use as an outer coating or enclosure for the food material. In addition to its novel usage in connection with a meat product casing, the food emulsion can also be applied as a liquid on a waxed or smooth metal or resin backing surface, mandrel or table and, after solidification, cut up in the form of strips, stripped off the backing surface, and used as a basting material which will melt when cooking heat is applied. Flavoring may be added by this means to a ham or other piece of meat. That is, cinnamon, lemon, lime, garlic, pineapple and various wine or liqueur flavors may be imparted during the cooking of a piece of meat by placing one or more solidified pieces or strips on it or in the cooking pan. A desired flavor may be added to the emulsion in its liquid state or before it is applied to the backing surface. The milk powder content used in the emulsion may also be a milk powder derivative.

We claim:

1. In an encased meat product that has an appealing and appetizing appearance and an increased shelf life and that comprises a length of compacted ground meat in packaged form for storage, shipment, display and purchase, wherein the packaged form has an easily sliced casing of a material that is to be removed before eating the meat content and the casing has an edible outer coating body that may be used for basting, a relatively thin-wall hollow supporting casing having closed-off back and front end portions, a meat body in a pressure-stuffed-filling positioning within said hollow casing, said meat body and casing being cooked and conditioned at a raised temperature followed by cooling to provide a stabilized product, said casing being immersion-soaked from its outer surface with an aqueous edible emulsion applied as a liquid whose viscosity is about 50 to 75 Saybolt Universal at 100° F., said emulsion being applied at a temperature of about 95° to 108° F. and solidified in an adherent relation as an outer surface coating on said casing, said solidified outer surface coating having a substantially uniform thickness and of greater thickness than said casing and being characterized by an outer nonsticky and smooth surface and a pleasing whitish color and a soft firmness, said outer coating comprising an emulsified mixture of water, gelatin, lard, milk powder and salt, said casing being of a somewhat porous unfinished paperlike material of a weight of about 1.25 to 1.95 ounces per yard, the emulsion of said outer coating being solidified on said casing by cooling it to a temperature within the neighborhood of about 40° F. but below about 50° F., and said meat body being cooled at a temperature of about 30° to 55° F. after cooking within said casing and before the application of the outer coating.

2. In an encased meat product as defined in claim 1, said solidified outer coating having a thickness of about one-eighth to one-fourth of an inch.

3. In an encased meat product as defined in claim 2, said aqueous emulsion consisting of water, gelatin, lard, milk powder and salt proportioned on the following bases: about 50 to 150 lbs. of water, about 20 to 30 lbs. of gelatin, about 5 to 15 lbs. of lard, about 15 to 25 lbs. of milk powder, and about 2 to 10 lbs. of salt.

4. In a method of providing an improved encased meat product in a cooked and surface conditioned form having an appealing and appetizing appearance and an increased shelf life, providing a relatively thin-wall hollow casing of a somewhat porous unfinished paperlike material having the weight of about 1.25 to 1.95 ounces per yard, a closed-off back end portion and an open front end portion; grinding up meat and pressure-stuffing it into and filling the casing through its open front end portion, securely closing off the open front end portion of the casing and thereafter cooking the meat within the casing at a temperature within the range of about 148° to 152° F., while moving the encased meat through a cooking oven; cooling the meat to a temperature of about 30° to 55° F. within the casing to set the meat and provide a stabilized product, forming an edible aqueous mixture of lard, gelatin, milk powder and salt into a liquid emulsion, moving the encased meat in a suspended relation through a bath of the liquid emulsion and soaking the casing with the emulsion while maintaining the emulsion at a temperature of about 95° to 108° F., and continuing to suspend the encased meat while dripping the emulsion therefrom and while cooling and solidifying the emulsion as a whitish, smooth and nonsticky substantially uniform thickness coating about the casing that is fully adherent with respect thereto for, in combination with the casing, retaining moisture of the meat and increasing the shelf life of the product.

5. In a method as defined in claim 4, controlling the temperature and viscosity of the emulsion as applied to the casing to provide it with a substantially uniform thickness of about one-eighth to one-fourth of an inch throughout its extent about the casing.

6. In a method as defined in claim 4, applying the emulsion in liquid form to the casing, and providing the liquid as being applied with a viscosity of about 50 to 75 Saybolt Universal at 100° F.

7. In a method as defined in claim 6, immediately after cooking the meat within the casing subjecting them to the specified cooling temperature to stabilize the product before the application of the liquid emulsion thereto.

8. In a method as defined in claim 7, endwise-suspending a spaced-apart group of meat-containing casings and progressively and successively subjecting the casings to the defined steps of cooking and cooling the meat therewithin, soaking each casing within the liquid emulsion and dripping the emulsion therefrom while cooling and solidifying it about the casing, all while continuously moving the meat-containing casings in a longitudinally forwardly advancing line.

* * * * *